(12) United States Patent
Kalte et al.

(10) Patent No.: US 12,253,876 B2
(45) Date of Patent: Mar. 18, 2025

(54) METHOD FOR PROGRAMMING AN FPGA

(71) Applicant: dSPACE GmbH, Paderborn (DE)

(72) Inventors: Heiko Kalte, Paderborn (DE); Dominik Lubeley, Paderborn (DE)

(73) Assignee: dSPACE GMBH, Paderborn (DE)

( * ) Notice: Subject to any disclaimer, the term of this patent is extended or adjusted under 35 U.S.C. 154(b) by 22 days.

(21) Appl. No.: 18/209,558

(22) Filed: Jun. 14, 2023

(65) Prior Publication Data

US 2023/0418324 A1    Dec. 28, 2023

(30) Foreign Application Priority Data

Jun. 23, 2022 (DE) .................... 10 2022 115 631.1

(51) Int. Cl.
*G06F 1/10* (2006.01)
*G06F 11/30* (2006.01)

(52) U.S. Cl.
CPC ............ *G06F 1/10* (2013.01); *G06F 11/3051* (2013.01)

(58) Field of Classification Search
CPC ................. G06F 1/32; G06F 1/12; G06F 9/44
See application file for complete search history.

(56) References Cited

U.S. PATENT DOCUMENTS

| 6,086,629 | A | 7/2000 | McGettigan et al. |
| 8,930,597 | B1 * | 1/2015 | Fung .................... G06F 13/1689 |
| | | | 370/545 |
| 2017/0208019 | A1 * | 7/2017 | Shimojou ............... H04L 47/82 |
| 2020/0264936 | A1 * | 8/2020 | Gurram ................. G06F 9/5044 |

OTHER PUBLICATIONS

Shanzhen Xing et al;"FPGA Adders: Performance Evaluation and Optimal Design" IEEE Design & Test of Computers, 1998, vol. 15 No. 1, pp. 24 to 29.
Wong et al; "Self-characterization of Combinatorial Circuit Delays in FPGAs"; IEEE International Conference on Field-Programmable Technology (FPT) 2007.

\* cited by examiner

*Primary Examiner* — Keshab R Pandey
(74) *Attorney, Agent, or Firm* — Muncy, Geissler, Olds & Lowe, P.C.

(57) ABSTRACT

A method for programming an FPGA, wherein a library with elementary operations and a respective latency table for each of the elementary operations of the library are provided. a data path is defined. The latencies are recorded for a multiplicity of clock rates that are different from one another and these latencies are added for every clock rate so that a total latency for the data path results for this multiplicity of different clock rates. The ratio between the lowest total latency and the total latency at a respective clock rate is determined. A utilization of the FPGA for each clock rate is identified. The ratio between the lowest utilization of the FPGA and the utilization of the FPGA at a respective clock rate is determined. A quality factor for each clock rate while taking into account the total latency and the utilization of the FPGA is determined.

12 Claims, 9 Drawing Sheets

METHOD FOR PROGRAMMING AN FPGA

This nonprovisional application claims priority under 35 U.S.C. § 119(a) to German Patent Application No. 10 2022 115 631.1, which was filed in Germany on Jun. 23, 2022, and which is herein incorporated by reference.

BACKGROUND OF THE INVENTION

Field of the Invention

The invention relates to a method for programming an FPGA (Field Programmable Gate Array) as well as to a nonvolatile, computer-readable storage medium with instructions stored thereon that implement such a method when they are executed on a processor.

Description of the Background Art

An FPGA is a digital integrated circuit into which a logic circuit can be loaded. As distinguished from the programming of computers, microcontrollers, and control units, in the case of FPGAs the term "programming" means not only the specification of time sequences, but also the definition of the desired circuit structure. This circuit structure is formulated by means of a hardware description language and is then translated by software into a configuration file that prescribes how the elements in the FPGA are to be connected. During the FPGA programming, therefore, a description of the hardware structure is generated that is then transferred to the actual FPGA with the aid of synthesis and routing tools. This hardware description typically takes place in specialized languages such as VHDL or Verilog. This is therefore also referred to as "FPGA configuration" instead of "FPGA programming." In contrast to the programming of computers, microprocessors, and control units, therefore, FPGA programming is not oriented to a given operating system and to a driver base. Instead, FPGA programming is aimed at the definition of structures in the semiconductor that later execute the intended functions. In this way, it is possible to achieve a degree of specialization and parallelism that can only be achieved with difficulty by conventional, prefabricated microprocessors.

Manual work with hardware descriptions requires a great deal of experience on the part of the developer. This means that development and verification times increase considerably with increasing complexity. As an alternative to manual programming, therefore, more and more tools for FPGA programming have become established that automate the generation and verification of HDL code from within a programming and development environment such as Simulink.

In the area of hardware-in-the-loop simulation (HIL simulation) and in rapid control prototyping systems (RCP systems), it has long been the case that pure processor models are no longer capable of handling real-time simulations, for example in the technical fields of power electronics and electromobility. In many applications, such as simulations, where extremely fast control loops are necessary, such models must be augmented or even replaced by FPGA models. Since these applications profit greatly from very fast control loops, even FPGAs reach their limits here.

Limiting factors here are the maximum clock cycle in which a model can be executed on an FPGA and the number of clock cycles an FPGA model requires for a complete pass. At a typical clock cycle of 100 MHz, which is to say a clock period of 10 ns, a controller with a length of one hundred clock cycles achieves a cycle time of 1 μs. The number of clock cycles required results here from the complexity of the calculation used. While simple logical operations can be performed asynchronously, which is to say completely without clock cycles, an addition or multiplication of a number with a relatively large bit width may require multiple clock cycles. In contrast to a processor, the number of clock cycles required for an operation is always identical and is set once during modeling to the lowest value at which the model can still be implemented for the given clock cycle for the FPGA hardware. It becomes clear in this way that the number of clock cycles required for an operation and thus also for a data path and a complete model are dependent on the clock cycle of the FPGA. Consequently, if the clock cycle is simply increased for faster control loops, then the clock cycles of individual operations must sometimes be increased in response, with the result that the gain from the faster clocking is often limited.

Therefore, in order to achieve the minimum run time for an FPGA model, the product of the clock period and the number of clock cycles for all mathematical operations of the longest data path must be minimized. An optimization of the run time with conventional systems is possible only with difficulty, however, since the clock rate, the latencies, and the bit width of a mathematical operation do not have a linear influence on one another. Moreover, in some cases there are additional implementation technologies such as DSP blocks and lookup tables (LUTs) as well as various FPGA technologies such as Xilinx Virtex, Kintex, etc., as well as FPGA speed grades.

The problem of achieving the shortest possible run time for an FPGA model has been addressed until now by the experience of the developer in question. As a rule, a developer has already implemented similar operations with a similar bit width on the same FPGA type at some point, so the developer knows which clock rates and which latencies have led to good results with the various operations. Alternatively, a very complex, manually performed design space exploration is carried out in which the design is implemented in many different configurations such as different clock rates and latencies of the individual operations.

In principle, this design space exploration could be automated, but this is something that is routinely avoided on account of the tremendous automation effort and the long implementation times for the creation of the FPGA design. This ultimately has the result that the clock rates chosen by the developer frequently do not represent the best possible solution, and it is virtually never clear how good the particular solution chosen by the developer actually is. One alternative to the procedure described above is design flows, in which the operations of a data path are entered in an abstract, high-level language, and the tool used for the purpose, such as Xilinx HLS, can automatically define the latencies of the individual operations. Here, too, however, the development must generally specify a clock rate, so that this method likewise does not ensure that the minimum possible run time, defined by the product of clock period and latency of the data path in question, is actually achieved.

The abstract idea of measuring the delay of elementary operations of an FPGA in order to optimize the entire model using this information is known from the article, "FPGA Adders: Performance Evaluation and Optimal Design" by Xing, S. and Yo, W. W. H., in IEEE Design & Test of Computers, 1998, vol. 15 no. 1, pages 24 to 29. Furthermore, the article, "Self-characterization of Combinatorial Circuit Delays in FPGAs" by Justin S. J. Wong, Pete Sedcole, and Peter Y. K. Cheung, (IEEE International Conference on Field-Programmable Technology (FPT), 2007), describes the search for the optimum clock rate for a given circuit. To this end, the clock rate is slowly raised until the circuit no longer functions, which is to say causes a so-called timing error. The highest possible clock rate is determined with greater precision than the step size by means of a statistical method. Finally, U.S. Pat. No. 6,086,629 A describes the creation of a database in which delays for primitive cells in so-called CLBs (Configurable Logic Blocks) are stored, and a use of the database for timing in routing the FPGA.

SUMMARY OF THE INVENTION

It is therefore an object of the invention to provide a possibility for carrying out sequences on an FPGA with a clock rate of a nature that permits a shortest possible run time.

According to an exemplary embodiment of the invention, a method for programming an FPGA is provided, wherein a library with elementary operations that are executable on the FPGA and a respective latency table for each of the elementary operations of the library are provided, wherein each latency table specifies, for a multiplicity of clock rates of the FPGA and for a multiplicity of input bit widths of the respective operation, the latency of the respective operation during execution on the FPGA as a function of the input bit width of the respective operation and the clock rate of the FPGA, wherein the method comprises the following method steps: defining a data path, wherein the data path specifies a sequential execution on the FPGA of at least two elementary operations of the library, recording the latencies given by the respective input bit width of the respective elementary operations of the data path for a multiplicity of clock rates that are different from one another in the latency tables, and adding these latencies for every clock rate so that a total latency for the data path results in each case for this multiplicity of different clock rates, determining the lowest total latency, determining, for all clock rates, the ratio between the lowest total latency and the total latency at a respective clock rate, identifying a utilization of the FPGA for each clock rate, determining the lowest utilization of the FPGA, determining, for all clock rates, the ratio between lowest utilization of the FPGA and the utilization of the FPGA at a respective clock rate, and determining a quality factor for each clock rate while taking into account the total latency and the utilization of the FPGA.

A primary goal here is to minimize the latency of the data paths for a control loop. However, there are also other goals, such as the maximum possible precision, the lowest possible resource demand, or the lowest possible energy consumption, etc. Since the FPGA always prescribes certain boundary conditions, such as existing resources and maximum power consumption, there consequently is never only the one primary goal, but instead always secondary goals as well. In general, a developer must keep multiple goals in mind, which is taken account according to the invention by the means that a quality factor is determined for each clock rate while taking into account the total latency and the utilization of the FPGA.

When elementary operations of the library are referred to herein, this preferably means such operations as are not further subdivided at this level of abstraction. These are operations such as an addition, a multiplication, or a comparison of values, for example. In principle, of course, the invention is independent of the specific implementation of the library with the elementary operations. However, the elementary operations of the library in this case are preferably elementary blocks from a block library of a programming environment designed for creating program logic in the form of a flow diagram constructed from elementary blocks.

In principle, the determination of the quality factor for each clock rate can be accomplished in different ways. According to a preferred embodiment of the invention, however, the determination of the quality factor for each clock rate is accomplished by means of a mathematical optimization method so that the quality factor with regard to the utilization of the FPGA and the total latency reflects a compromise between minimum utilization and minimum total latency. The intent is thus to determine a combination of utilization and total latency that is as close as possible to the optimum in such a way that it ensures the lowest possible utilization, on the one hand, while at the same time ensuring the lowest possible total latency. Of course, it is not possible to bring the utilization and the total latency to an absolute minimum at the same time. This is why the goal here is to approach an optimal combination of utilization and total latency, namely with the abovementioned mathematical optimization method.

This mathematical optimization method can now be designed in various ways. According to a preferred improvement of the invention, it is the case in this regard that the determination of the quality factor for each clock rate is carried out through addition of the ratio between the lowest total latency and the total latency at the respective clock rate on the one hand and the ratio between the lowest utilization of the FPGA and the utilization of the FPGA at the respective clock rate on the other hand, wherein the ratio between the lowest total latency and the total latency at each clock rate is weighted with a latency weighting factor, and the ratio between the lowest utilization of the FPGA and the utilization of the FPGA at each clock rate is weighted with a utilization weighting factor. It has become apparent that an efficient and reproducible optimization can be accomplished in this way. It is furthermore preferably the case here that the latency weighting factor is the same for all clock rates. Moreover, it is preferably also the case that the utilization weighting factor is the same for all clock rates.

With regard to the utilization of the FPGA, different demand quantities of the FPGA can be taken into account in principle. Preferably, however, provision is made that the utilization of the FPGA that is taken into account at a specific clock rate includes the resource demand and/or the power demand on the FPGA at the clock rate in question. It is furthermore preferably the case here that the resource demand or the power demand on the FPGA is identified at a specific clock rate with the aid of previously provided resource demand tables or power demand tables, wherein the resource demand tables or the power demand tables specify the resource demand or the power demand of a specific operation during execution on the FPGA as a function of the input bit width of the specific operation and the clock rate of the FPGA for a multiplicity of clock rates of the FPGA and for a multiplicity of input bit widths of the specific operation.

These resource demand tables or the power demand tables can have been created in advance through measurements on an FPGA of the same type. In particular, it is most especially preferred here that the latency tables have been created in advance through measurements on an FPGA of the same type.

The taking into account of the utilization of the FPGA can now be embodied in different ways in the present case. According to an example, the clock rates at which the utilization of the FPGA can be above a predetermined utilization limit are rejected prior to the step of determining the ratio between the lowest utilization of the FPGA and the utilization of the FPGA at a specific clock rate. Such clock rates are thus viewed as effectively impermissible, and are no longer taken into account for the remainder of the procedure.

With regard to the choice of the clock rate to be used, provision is made according that the clock rate that is associated with the highest quality factor is chosen. This clock rate is therefore the clock rate that is viewed as coming the closest to the optimum within the framework of the present method.

The invention further relates to a nonvolatile, computer-readable storage medium with instructions stored thereon that implement a method as described above when they are executed on a processor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
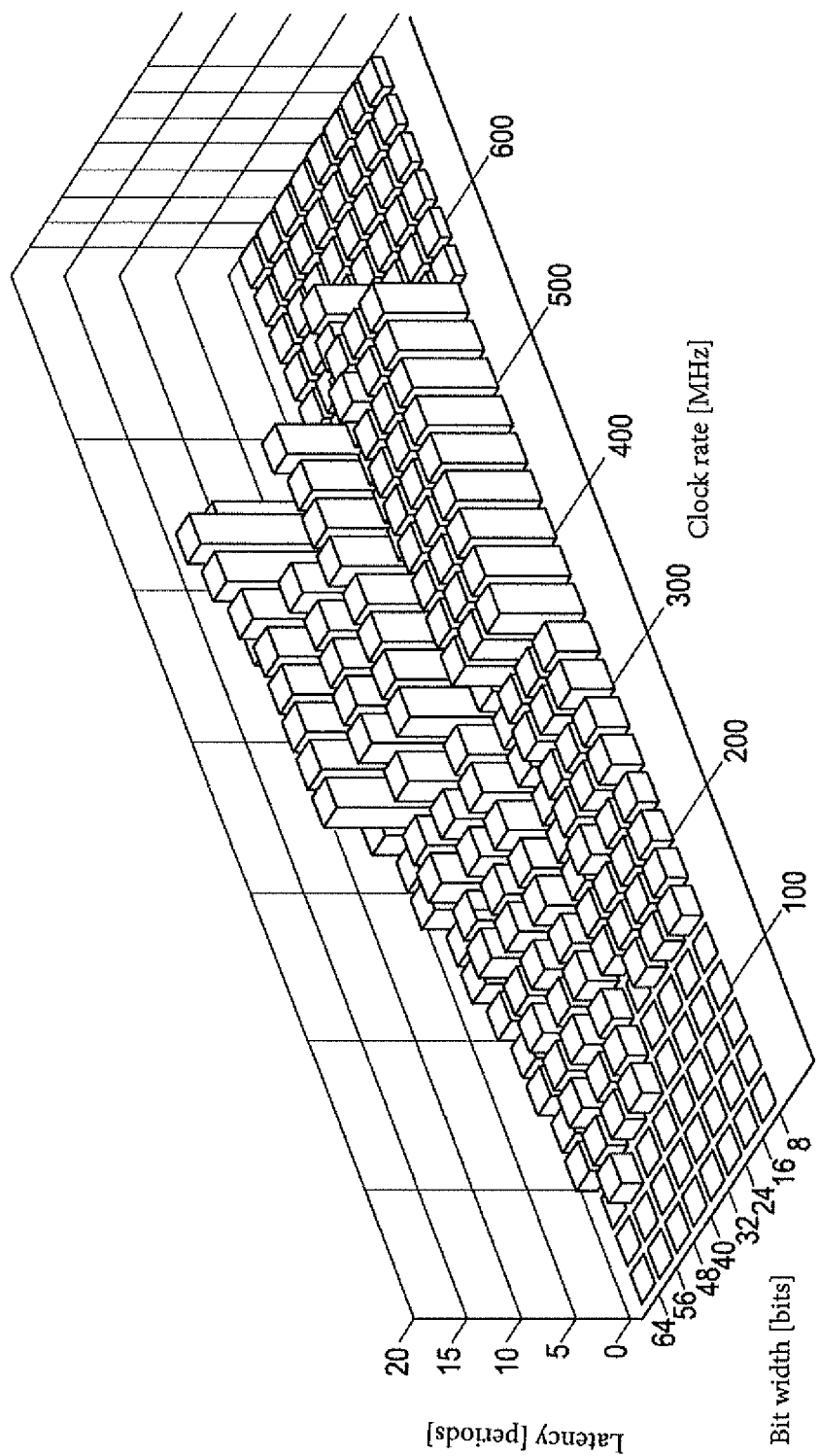
FIG. 1 shows a plot of the latency of a multiplication operation on an FPGA of a specific type as a function of the clock rate of the FPGA and of the bit width of the operation, wherein the latency is specified in periods.

In principle it is possible to create, in advance, a respective latency table for every elementary operation that can be executed on a specific FPGA, from which table the latency of the respective operation can be read as a function of the clock rate and the bit width of the input data. By means of these tables, the latency of a data path in an FPGA model as a function of the clock rate can then be identified in a simple way by adding up the individual latencies for each elementary operation of the data path. To this end, FIG. 1 shows a plot of the latency of a multiplication operation on a specific FPGA as a function of the clock rate of the FPGA and of the bit width of the operation. In FIG. 1, the latency is specified in periods. What is represented, therefore, is how many periods at a given bit width of the operation and a respective clock rate are required to operate the FPGA for complete execution of the operation.

Figure 2:
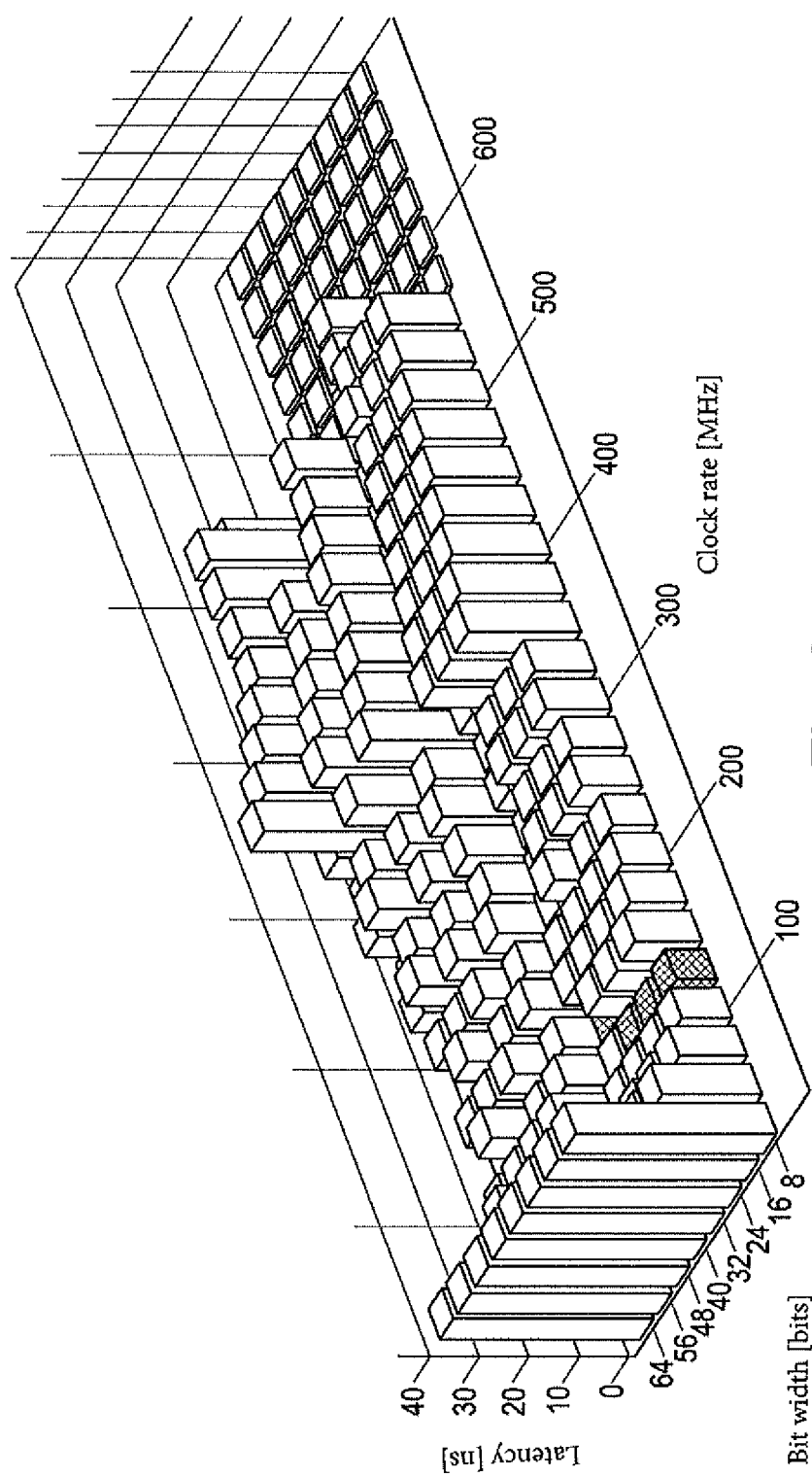
FIG. 2 shows a plot of the latency of a multiplication operation on an FPGA of a specific type as a function of the clock rate of the FPGA and of the bit width of the operation, wherein the latency is specified in nanoseconds (ns), FIG. 3 schematically shows a data path formed of an addition, a multiplication, and a root function, FIG. 4 schematically shows the identification of the total latency of the data path from FIG. 3.

If it is now of interest to identify the clock rate at a given bit width for which the fastest possible execution will result, then the product of the clock rate and the number of periods required for complete execution is key. The same is represented in FIG. 2, which shows a plot of the latency of the same multiplication operation as in FIG. 1 as a function of the clock rate of the FPGA and of the bit width of the operation, wherein in FIG. 2 the latency is now specified in nanoseconds (ns). The clock rate at which the lowest latency results is shown in FIG. 2 as a cross-hatched bar for each of the bit widths of 8 bits, 16 bits, 24 bits, and 32 bits. It can be seen that this lowest latency of approximately 10 ns is in a range of a little over 100 MHz. As is evident from FIG. 2, a significantly longer latency results in each case for higher clock rates to above 500 MHz, so that a relatively low clock rate provides the best results here.

The latencies are represented as three-dimensional bar charts in FIG. 1 and FIG. 2, in one case specified in the number of periods and in one case specified in the time (in ns) for complete execution of the operation as a function of the bit width and the clock rate. However, this manner of representation merely serves the purpose of illustration in the present case. For provision of a respective latency table for the elementary operations of the provided library that can be executed on the FPGA in order to execute a method according to the invention, however, it is advantageous to provide these data in the form of a numeric table in which a latency as a time quantity, for example in nanoseconds, is associated with each pair formed of a bit width and a clock rate. A table of this nature can be stored as a lookup table, for example, which can be accessed digitally during the execution of a method according to the invention. Such a table can in principle appear as follows, wherein only latencies for clock rates of 60 to 140 MHz and 8 to 40 bits are specified here by way of example.

|  | 60 MHz | 80 MHz | 100 MHz | 120 MHz | 140 MHz | ... |
| --- | --- | --- | --- | --- | --- | --- |
| 8 bits | 40 ns | 21 ns | 18 ns | 10 ns | 14 ns | ... |
| 16 bits | 40 ns | 21 ns | 19 ns | 10 ns | 15 ns | ... |
| 24 bits | 40 ns | 32 ns | 22 ns | 12 ns | 18 ns | ... |
| 32 bits | 40 ns | 35 ns | 23 ns | 13 ns | 19 ns | ... |
| 40 bits | 40 ns | 36 ns | 25 ns | 15 ns | 21 ns | ... |
| ... | ... | ... | ... | ... | ... | ... |

These clock rates correspond to a different operation that is not the basis for FIGS. 1 and 2. Apart from this, it should be noted that tables are always provided that are created for discrete clock rates, with a spacing of 20 MHz from one another in the case of the above table. In this regard, it is of course also possible to provide a finer grid of clock rates; even though this increases the effort for creating the latency tables, it does permit more precise identification of the clock rate that allows the fastest execution in the FPGA for an elementary operation or a specific data path.

Figure 3:
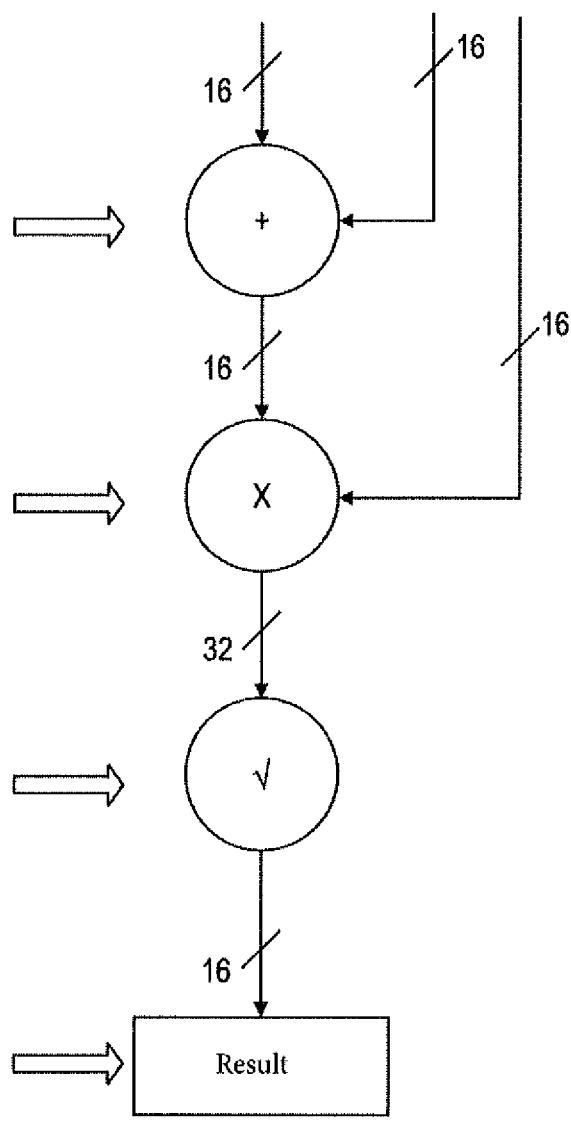

Now, as regards the identification of the total latency for a data path that is formed of a multiplicity of elementary operations, please refer to FIG. 3. It is shown schematically there that the data path considered in the present case includes an addition with an input bit width of 16 bits, a multiplication with an input bit width of 16 bits and an output bit width of 32 bits, and a root function with an input bit width of 32 bits and an output bit width of 16 bits. If the total latency is now to be determined for this data path represented in FIG. 3, then the latencies (in ns) specified in the respective associated latency table for the three functions of addition, multiplication, and root function must be added up for all clock rates and at the respective input bit width of the corresponding operation.

Figure 4:
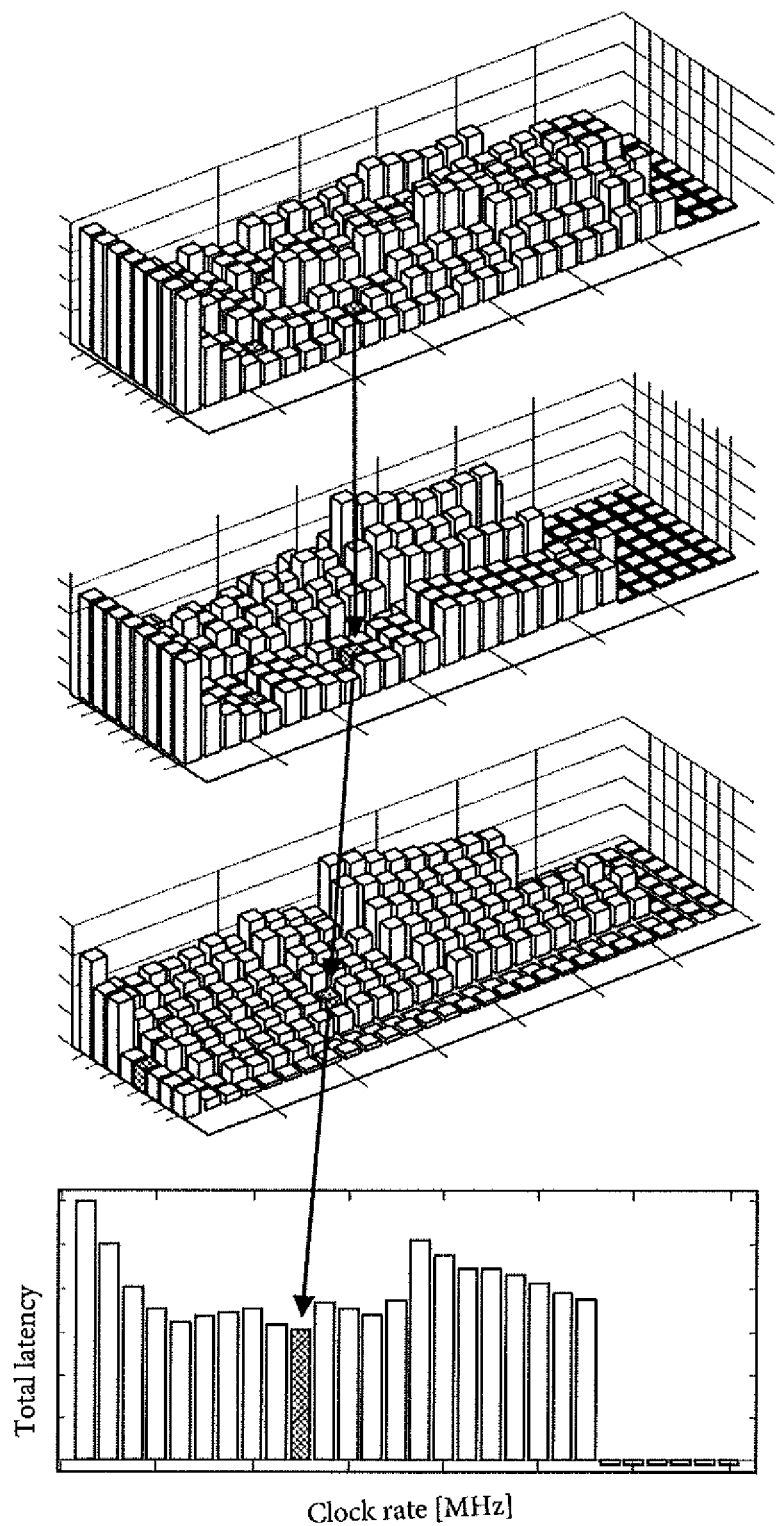

This is represented schematically in FIG. 4, in which the axis labels have been omitted in the three-dimensional bar charts for the sake of clarity. The arrows indicate by way of example how, for a certain clock rate, it is necessary to add up, firstly, the latency for the addition for 16 bits, then the corresponding latency for the multiplication for 16 bits, and finally the latency for the root function of 32 bits. This results in the bar chart for all clock rates depicted at the very bottom in FIG. 4 that depict the total latency, which is to say the totals of the latencies of the addition, the multiplication, and the root function, as a function of the respective clock rate. It can be seen that the addition path, shown by way of example with arrows, is associated with the particular clock rate that delivers the lowest total latency overall. It is notable in this regard that the lowest latency in each case for the three different elementary operations occurs at entirely different and significantly lower clock rates (represented in FIG. 4 as cross-hatched bars). However, when these three elementary operations are combined, the procedure described here results in an entirely different clock rate that delivers the best result in the present case for the operation of the FPGA.

In this way, it is possible to determine, for every data path intended to be used in operation of the FPGA, a clock rate that is "optimal" inasmuch as it corresponds to the clock rate with the lowest total latency. As already addressed above, it may be the primary goal to minimize the latency of the data paths for a control loop. However, there are also other goals, such as the maximum possible precision, lowest possible resource demand or energy consumption, etc. Since the FPGA always prescribes certain boundary conditions, such as existing resources and maximum power consumption, there consequently is never only a single goal, but instead always at least one secondary goal in addition to a primary goal. As a rule, therefore, it is always necessary to aim for multiple goals at once, which is achieved in the present case by the means that a quality factor is determined for every clock rate while taking into account the total latency as well as the utilization of the FPGA. This is described in detail below.

Figure 5:
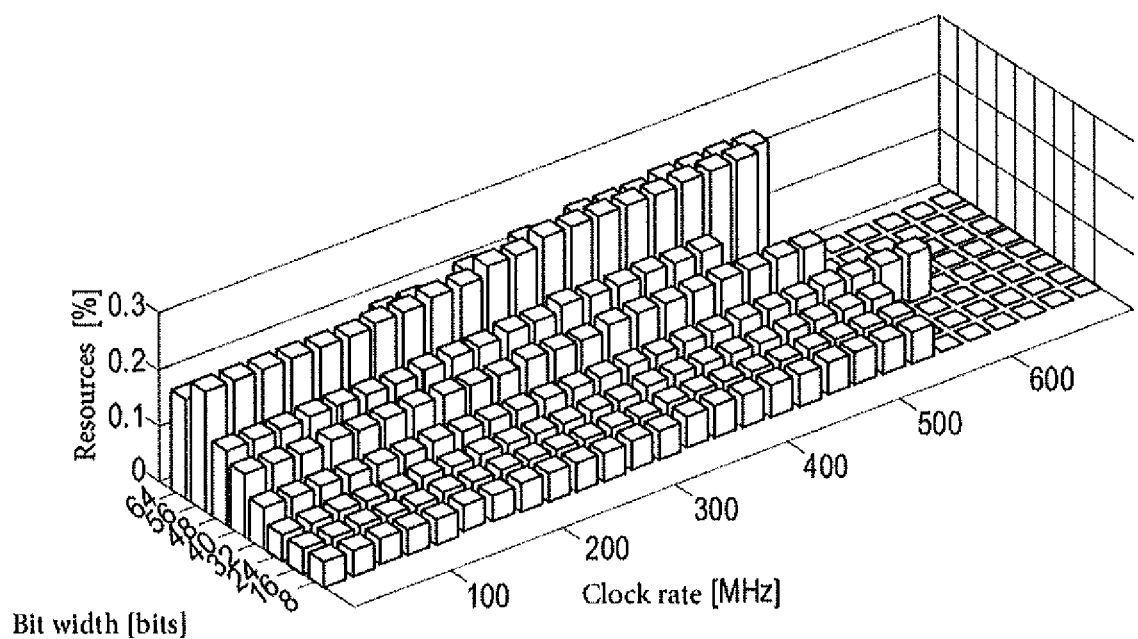
FIG. 5 shows a plot of the resources required for a multiplication operation on an FPGA of a specific type as a function of the clock rate of the FPGA and of the bit width of the operation, wherein the resources are specified as a percentage (%) of the total resources.

In FIG. 5, a resource profile is depicted that correlates with the clock cycle count profile from FIG. 1 and the latency time profile from FIG. 2. Here, the resource demand measured as a percentage of the total FPGA resources is plotted on the z-axis. The profiles can be provided separately for the most important FPGA resources of LUTs, flipflops, DSPs, blockRAM, and can be extended to additional FPGA resources of AI cores of FPGAs. It is thus also possible to address dedicated, especially scarce resources during the method. For easier visualization, the percentage values of the individual components in FIG. 5 are added with equal weighting and divided by the number of components.

Figure 6:
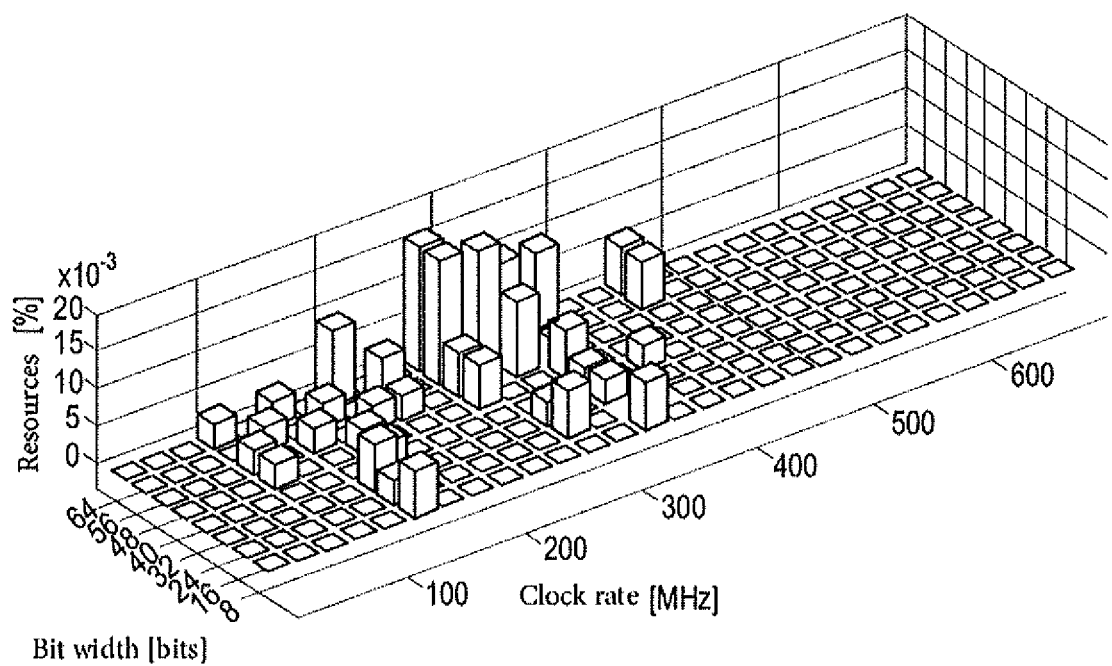
FIG. 6 shows a plot of the resource changes (Δ resources) of the multiplication operation from FIG. 5 as a function of the clock rate of the FPGA and of the bit width of the operation, wherein the Δ resources are specified as a percentage (%), FIG. 7 schematically shows the identification of the total latency of the data path as in FIG. 4, wherein dashed lines are shown as examples that lead to similarly low total latencies at a lower clock, and thus as a general rule to lower resource consumption, FIG. 8 schematically shows the identification of the total gain of the data path as in FIG. 7, wherein the solid arrows lead to the total gain of the optimal clock cycle with the lowest total latency at reduced resource/power demand and the highest gain, and the dashed arrows lead to the highest gain from which an alternative clock cycle with lower resource demand and similarly low total latency results, FIG. 9 schematically shows the identification of the total gain of the data path as in FIG. 7, wherein the solid arrows show the total resources for the resources of the optimal clock cycle with the lowest total latency, and the dashed arrows lead to the resources that result from the clock rate identified in FIG. 8, and FIG. 10 schematically shows a user interface with which the weights of different goals can be set.

In order to illustrate that some clock rate changes produce especially large potential savings, delta resource profiles (Δ resources), which correspond to the first derivative of the resources with respect to the clock cycle, have been calculated in FIG. 6 from the resource profiles. FIG. 6 should be understood here such that the high bars cause a great change in the resources. This means that an increase in the clock rate at certain points produces a disproportionately high increase in the resource demand.

With the aid of the profiles described with reference to FIGS. 1 to 4 and the resource profiles described earlier, a large data set of information relating to the quantities of clock rate, latency, processing speed, resource demand, and precision/bit width (power demand) can be obtained. Various questions can be answered very efficiently from these data, e.g., the following questions:

1. The data path width is set, a low latency is very important, and the desire is to determine an implementation that can still be accommodated in the FPGA or does not exceed a given FPGA size under these boundary conditions.
2. The desire is to determine the widest data path, which is to say the data path with the highest precision, that can still be accommodated in the FPGA or does not exceed a specified FPGA size at a given processing speed or at a given latency. In this way, it is also possible, e.g., to efficiently identify whether a design can be converted from the fixed-point format to the simpler-to-model but more resource-intensive floating-point format.

In addition, a power profile can also be created for each operation as a function of bit width and clock rate. For this reason, another question can be:

3. The bit width is set, and the desire is to optimize the data paths in order to obtain the greatest power saving with the smallest possible changes so that a predetermined power budget is not exceeded.

Figure 7:
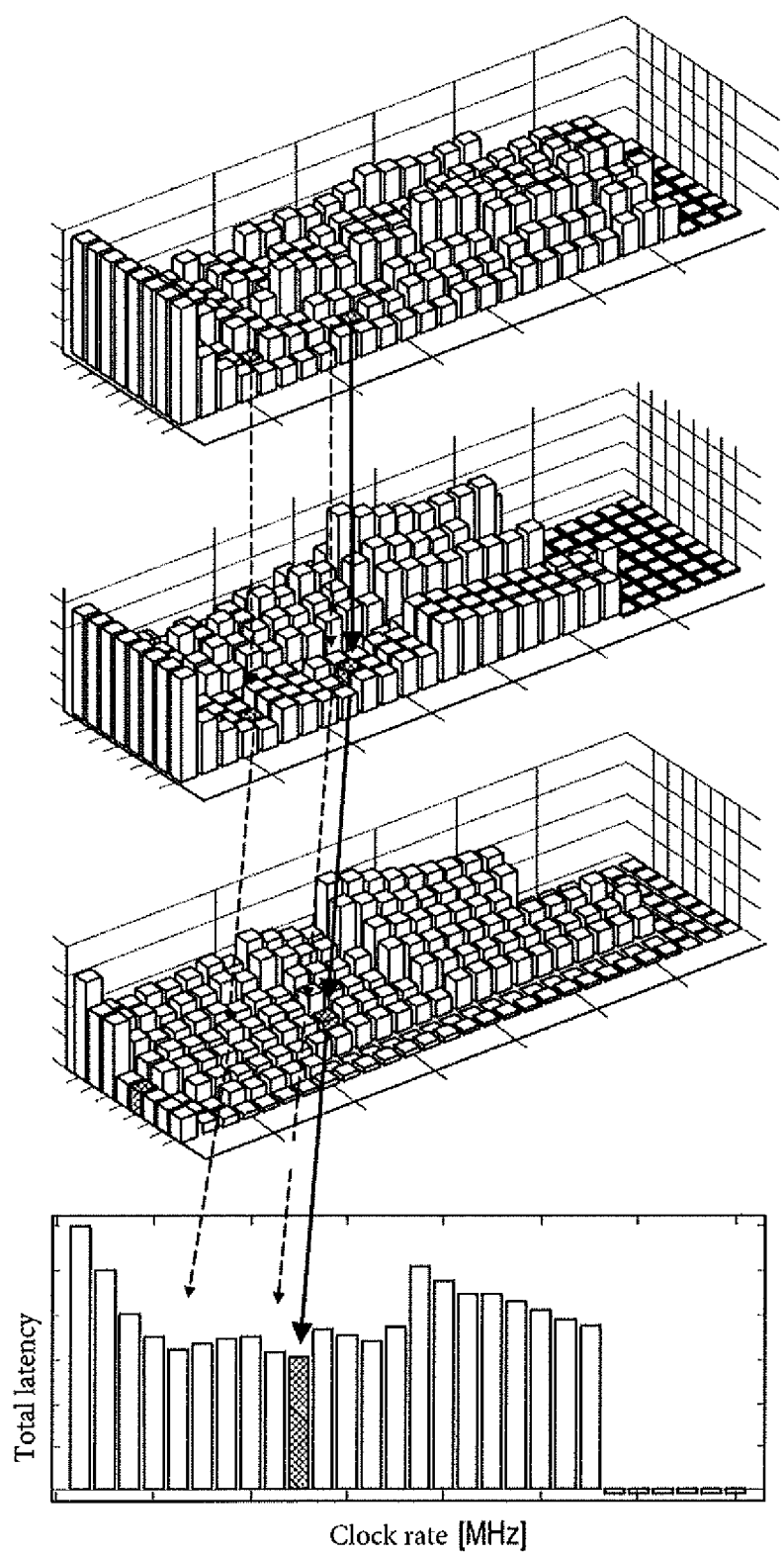

Question 1 is considered by way of example below. The principle of the method is represented in FIG. 7:

A new clock rate is sought that leads to maximum resource saving with minimal degradation in latency. In principle, FIG. 7 corresponds to FIG. 4, wherein dashed lines are now additionally depicted as examples with similarly low total latencies at lower clock rates that generally lead to a lower resource consumption.

The procedure for optimizing the FPGA resources for a data path is explained below. This procedure is used when the FPGA implements only one data path or when each data path gets its own clock domain, and it can therefore be assumed that all data paths can be optimized independently of one another. When there are multiple data paths and, e.g., only one clock domain for all of the logic, then cross-dependencies arise during optimization of an individual data path because a change in the clock rate directly affects the other data paths.

The individual steps for optimization of a data path are as follows:

First, a latency profile l(c) as a function of the clock rate c and the optimal-latency clock rate now are determined, as described above on the basis of FIGS. 1 to 4. Then the identification of the data path resource demand r(c) or/and, if applicable, the data path power demand p(c) takes place. All values that are above a specific resource or power limit (provided by the total resources of the FPGA or the available current/the available cooling capacity) are set to −1 and thus are invalid solutions. Then the identification of the gain $g_{path}(c)$ of the data path with an alternative, resource-saving or/and energy-saving clock cycle relative to the result with optimal total latency takes place. For this purpose, the minimum latency $l(c_{lopt})$ at the clock rate $c_{lopt}$ and in general the latency l(c) as a function of the clock rate c as well as the lowest resource demand $r(c_{ropt})$ and the resource demand r(c) (or power demand $p(c_{popt})$, p(c)) are placed in a ratio as in the formula below. The weighting of the optimization goals of latency or resources/power can be carried out by a weighting $w_l$ for latency and $w_r$ for resources/power on the basis of a gain function, for example the following gain function (1.1):

$$g_{path}(c) = \frac{1}{2}\left(w_l \frac{l(c_{lopt})}{l(c)} + w_r \frac{r(c_{ropt})}{r(c)}\right) \quad (1.1)$$

The value of the function $g_{path}$ is the quality factor of the clock rate c, on which basis a decision is made as to whether the clock rate c is a suitable clock rate for operation of the FPGA. It can be seen in FIG. 8 that the highest gain is close to a more resource-saving, lower clock rate. If the resources were to have more than 50% weight, the difference would be more pronounced. In this example, no resource limit was drawn, which is to say no gains were set to −1. Oftentimes, the optimal-latency frequency is not available at all due to a resource limit, and clearer gain ratios arise.

Figure 9:
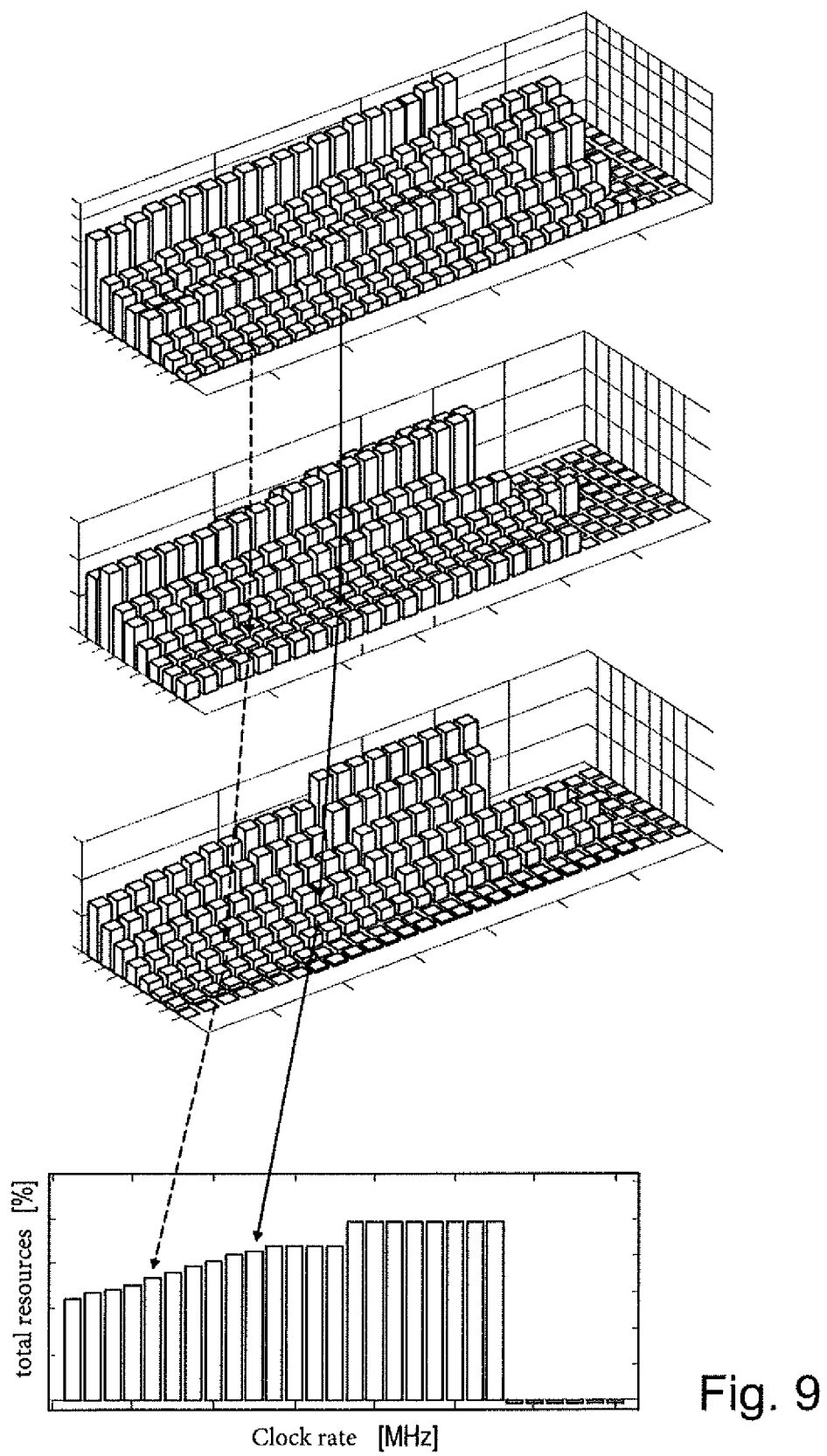

The step of resource identification/power identification is depicted in FIG. 9. It can essentially be seen there that a frequency with lower resource demand was found through the gain function.

It represents an option that, in the case of multiple data paths, the model does not operate with separate clock frequencies for each data path, but instead there is a grouping of multiple data paths into one clock domain. Then it is not the gains of the individual paths that are to be identified, but instead the gains of the individual domains, and in each case the clock frequency for an entire domain is to be replaced. Also optional is a change in the implementation variant: Most computation operations exist as both LUT and DSP implementation variants. In order to conserve certain scarce resources such as LUTs or DSPs, it is also possible for the analysis to take into account an automatic switching the implementation variant in an additional step. The latency behavior can also change as a result, of course.

The following applies in general:

The method can be formulated as follows for the FPGA modeling in general and for arbitrary optimization goals z that are dependent on the clock frequency c and have different weightings w:

$$g_{path}(c) = \frac{1}{\sum_i w_i} \sum_i w_i \frac{z_i(c_{iopt})}{z_i(c)} \quad (1.2)$$

Since the profiles used are also dependent on the bit width b, the method can in principle also be applied to the bit width and accordingly be formulated as follows:

$$g_{path}(b) = \frac{1}{\sum_i w_i} \sum_i w_i \frac{z_i(b_{iopt})}{z_i(b)} \quad (1.3)$$

The bit width of an operation is set in formula 1.2 so that only the clock rate can be varied, which influences the processing speed. In formula 1.3, in contrast, the bit width is varied at a fixed clock rate, which influences precision. If there are no specifications with regard to the processing speed or the precision, a two-dimensional gain function can ultimately also be formulated:

$$g_{path}(b, c) = \frac{1}{\sum_i w_i} \sum_i w_i \frac{z_i(b_{iopt}, c_{iopt})}{z_i(b, c)} \quad (1.4)$$

Figure 8:
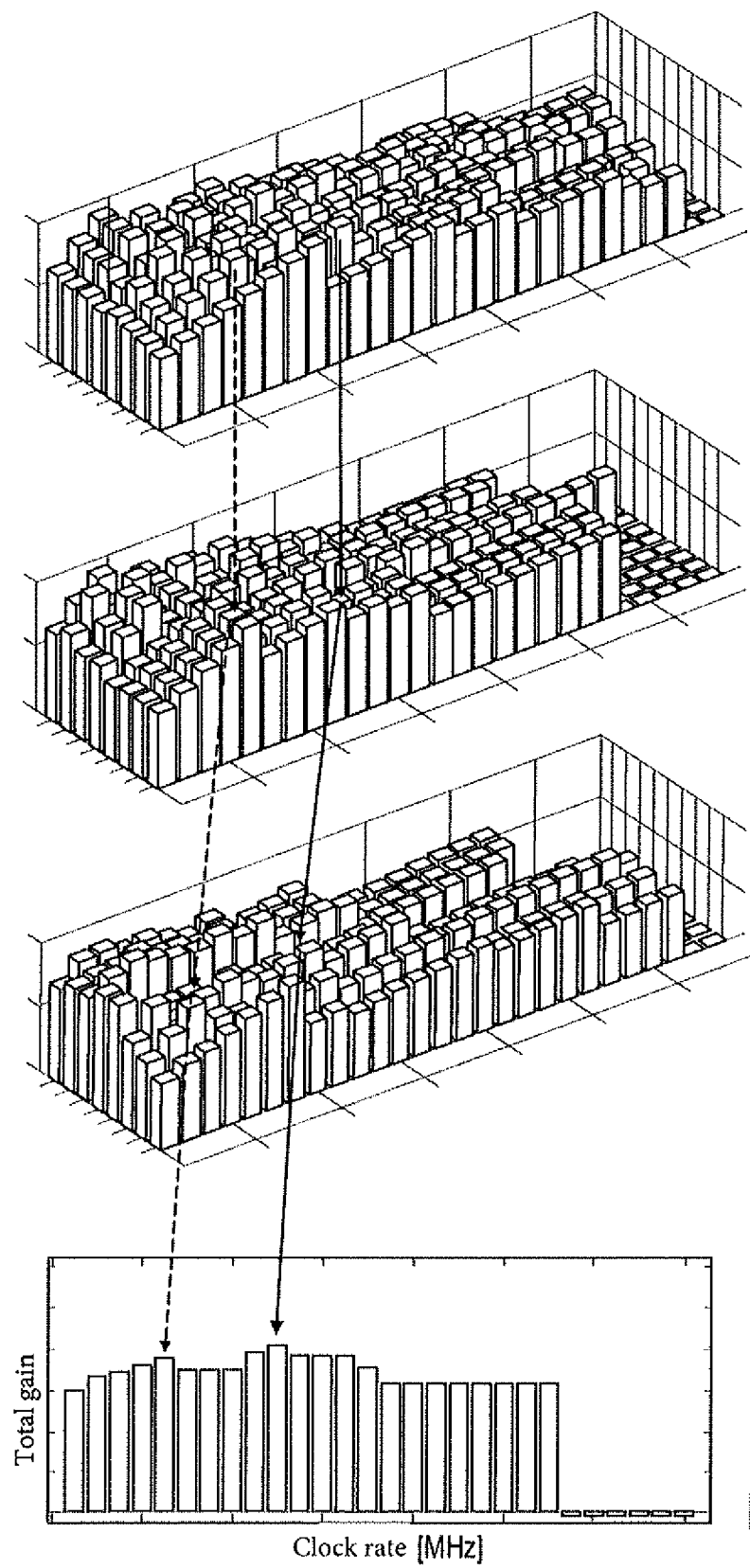

In the case of the two-dimensional gain function, a two-dimensional result function is obtained in the representation of the result instead of a one-dimensional result function as in FIGS. 7, 8, and 9. Practice-oriented questions can generally be mapped to the one-dimensional gain functions 1.2 and 1.3, however.

Accordingly, the complete generalization of the multi-goal optimizations dependent on n parameters p is:

$$g_{path}(p_1, p_2, \ldots, p_n) = \frac{1}{\sum_i w_i} \sum_i w_i \frac{z_i(p_{1_{iopt}}, p_{2_{iopt}}, \ldots, p_{n_{iopt}})}{z_i(p_1, p_2, \ldots, p_n)} \quad (1.5)$$

Figure 10:
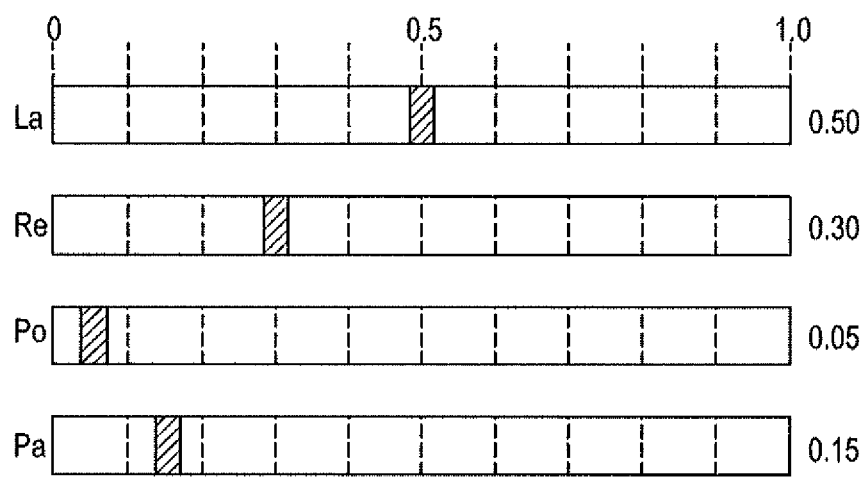

The method can work with default values for the weights, or can offer the user parameterization, for example via sliders from 0 to 1 for each goal, as depicted in FIG. 10. The latency La, the resources Re, the power Po, and an additional parameter Pa can be adjusted as goals here. The difference by which the weight of a goal has been shifted is distributed among the other goals uniformly and inversely.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for programming an FPGA, wherein a library with elementary operations that are executable on the FPGA and a respective latency table for each of the elementary operations of the library are provided, wherein each latency table specifies, for a plurality of clock rates of the FPGA and for a plurality of input bit widths of the respective operation, the latency of the respective operation during execution on the FPGA as a function of the input bit width of the respective operation and the clock rate of the FPGA, the method comprising:

defining a data path that specifies a sequential execution on the FPGA of at least two elementary operations of the library;

recording the latencies given by the respective input bit width of the respective elementary operations of the data path for a multiplicity of clock rates that are different from one another in the latency tables;

adding the recorded latencies for every clock rate so that a total latency for the data path results in each case for this multiplicity of different clock rates;

determining a lowest total latency;

determining, for all clock rates, a ratio between a lowest total latency and a total latency at a respective clock rate;

identifying a utilization of the FPGA for each clock rate;

determining a lowest utilization of the FPGA;

determining, for all clock rates, a ratio between the lowest utilization of the FPGA and the utilization of the FPGA at a respective clock rate; and determining a quality factor for each clock rate while taking into account the total latency and the utilization of the FPGA, wherein the utilization of the FPGA at a specific clock rate includes the resource demand and/or the power demand on the FPGA at the clock rate in question, wherein the resource demand or the power demand on the FPGA is identified at a specific clock rate with the aid of previously provided resource demand tables or power demand tables, and wherein the resource demand tables or the power demand tables specify the resource demand or the power demand of a specific operation during execution on the FPGA as a function of the input bit width of the specific operation and the clock rate of the FPGA for a multiplicity of clock rates of the FPGA and for a multiplicity of input bit widths of the specific operation.

2. The method according to claim 1, wherein the determination of the quality factor for each clock rate is carried out via a mathematical optimization method so that the quality factor with regard to the utilization of the FPGA and the total latency reflects a compromise between minimum utilization and minimum total latency.

3. The method according to claim 1, wherein the determination of the quality factor for each clock rate is carried out through addition of the ratio between the lowest total latency and the total latency at the respective clock rate and the ratio between the lowest utilization of the FPGA and the utilization of the FPGA at the respective clock rate, and the ratio between the lowest total latency and the total latency at each clock rate is weighted with a latency weighting factor, and wherein the ratio between the lowest utilization of the FPGA and the utilization of the FPGA at each clock rate is weighted with a utilization weighting factor.

4. The method according to claim 3, wherein the latency weighting factor is the same for all clock rates.

5. The method according to claim 3, wherein the utilization weighting factor is the same for all clock rates.

6. The method according to claim 1, wherein the resource demand tables or the power demand tables have been created in advance through measurements on an FPGA of the same type.

7. The method according to claim 1, wherein the latency tables have been created in advance through measurements on an FPGA of the same type.

8. The method according to claim 1, wherein the clock rates at which the utilization of the FPGA is above a predetermined utilization limit are rejected prior to the step of determining the ratio between the lowest utilization of the FPGA and the utilization of the FPGA at a specific clock rate.

9. The method according to claim 1, further comprising: choosing the clock rate that is associated with the highest quality factor.

10. The method according to claim 1, wherein the elementary operations of the library cannot be further subdivided.

11. The method according to claim 1, wherein the elementary operations of the library are elementary blocks from a block library of a programming environment designed for creating program logic in the form of a flow diagram constructed from elementary blocks.

12. A non-transitory, computer-readable storage medium with instructions stored thereon that implement the method according to claim 1 when they are executed on a processor.

* * * * *